US012580144B2

(12) United States Patent
Raab et al.

(10) Patent No.: US 12,580,144 B2
(45) Date of Patent: Mar. 17, 2026

(54) ELECTRONIC MODULE

(71) Applicant: Siemens Aktiengesellschaft, Munich (DE)

(72) Inventors: Oliver Raab, Ortenburg (DE); Stefan Kiefl, Munich (DE); Markus Schwarz, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 154 days.

(21) Appl. No.: 18/003,534

(22) PCT Filed: May 19, 2021

(86) PCT No.: PCT/EP2021/063309
§ 371 (c)(1),
(2) Date: Dec. 28, 2022

(87) PCT Pub. No.: WO2022/002479
PCT Pub. Date: Jan. 6, 2022

(65) Prior Publication Data
US 2023/0253173 A1 Aug. 10, 2023

(30) Foreign Application Priority Data
Jun. 29, 2020 (DE) ..................... 10 2020 208 054.2
Aug. 31, 2020 (EP) .................................... 20193548

(51) Int. Cl.
*H01H 59/00* (2006.01)
*H01H 1/00* (2006.01)
*H01H 71/00* (2006.01)

(52) U.S. Cl.
CPC ...... *H01H 59/0009* (2013.01); *H01H 1/0036* (2013.01); *H01H 71/00* (2013.01); *H01H 2071/008* (2013.01)

(58) Field of Classification Search
CPC ....... H01H 2001/0036; H01H 59/0009; H01H 1/0036; H01H 71/00; H01H 2071/008;
(Continued)

(56) References Cited

U.S. PATENT DOCUMENTS

| | | | | |
|---|---|---|---|---|
| 6,452,249 B1 * | 9/2002 | Maeda | ................. | H01L 23/645 257/E27.026 |
| 6,969,891 B1 | 11/2005 | Leroux | ......................... | 257/355 |

(Continued)

FOREIGN PATENT DOCUMENTS

| | | | | |
|---|---|---|---|---|
| DE | 198 50 397 | 5/2000 | ............... | H02H 3/28 |
| DE | 19850397 A1 * | 5/2000 | ........... | H01H 1/0036 |

(Continued)

OTHER PUBLICATIONS

Search Report for International Application No. PCT/EP2021/063309, 10 pages, Sep. 14, 2021.

(Continued)

*Primary Examiner* — Anthony R Jimenez
(74) *Attorney, Agent, or Firm* — Slayden Grubert Beard PLLC

(57) ABSTRACT

Various embodiments of the teachings herein include an electronic module comprising a microelectromechanical system (MEMS) switch with a substrate and a semiconductor component. The semiconductor component is formed with the substrate and connected to MEMS switch. The semiconductor component includes a diode. The substrate is formed from or with a silicon-on-insulator-wafer and/or silicon-on-insulator substrate.

10 Claims, 4 Drawing Sheets

(58) Field of Classification Search

CPC .. H01H 57/00; H01H 59/00; H01H 2057/006; B81B 3/0072; B81B 3/0021; B81B 2201/01; B81B 2201/014; B81B 2203/0118; B81B 2203/0315; B81B 2203/04; B81C 2203/0015; B81C 2203/00365; B81C 2203/00476; B81C 2203/00619; B81C 2203/00626; B81C 2203/00666; B81C 2201/0109; B81C 2201/013; B81C 2201/0167; B81C 2201/017; B81C 2203/0136; B81C 2203/0172; G06F 17/5068; G06F 17/5072; Y10T 29/42; Y10T 29/435; Y10T 29/49002; Y10T 29/49105; Y10T 29/49121; Y10T 29/49126; Y10T 29/4913; Y10T 29/49155; Y10T 29/5313; H01L 2924/0002; Y10S 438/937

USPC .......................................................... 200/181

See application file for complete search history.

(56) References Cited

U.S. PATENT DOCUMENTS

| | | | | |
|---|---|---|---|---|
| 7,205,173 | B2 | 4/2007 | Brunson et al. | 438/48 |
| 7,745,892 | B1 * | 6/2010 | Ivanov | B81C 1/00246 257/E21.481 |
| 10,855,073 | B2 * | 12/2020 | Fitzgerald | H02H 9/04 |
| 2006/0077504 | A1 * | 4/2006 | Floyd | H10D 89/60 359/237 |
| 2008/0164961 | A1 | 7/2008 | Premerlani et al. | 335/7 |
| 2008/0165457 | A1 | 7/2008 | Premerlani et al. | 361/31 |
| 2008/0211347 | A1 | 9/2008 | Wright et al. | 310/318 |
| 2009/0107813 | A1 * | 4/2009 | O'Brien | H01H 59/0009 361/207 |
| 2017/0369303 | A1 | 12/2017 | Morita et al. | |
| 2019/0172672 | A1 | 6/2019 | Bauer | H01H 59/0009 |

FOREIGN PATENT DOCUMENTS

| | | | | |
|---|---|---|---|---|
| DE | 10 2017 215 236 | | 2/2019 | B81B 7/02 |
| EP | 2 056 325 | | 5/2009 | H01H 59/00 |
| JP | 2008252880 | A | 10/2008 | H03K 17/00 |
| JP | 2009010027 | A | 1/2009 | H01L 21/822 |
| JP | 2009095225 | A | 4/2009 | H02H 9/04 |
| JP | 4495466 | B2 | 7/2010 | B81B 7/02 |
| JP | 2010221372 | A | 10/2010 | B81B 3/00 |
| JP | 4799735 | B2 | 10/2011 | H01L 21/329 |
| JP | 2016144261 | A | 8/2016 | B81B 3/00 |
| WO | 2011 047356 | | 4/2011 | H01H 59/00 |

OTHER PUBLICATIONS

Search Report for EP Application No. 20193548.3, 8 pages, Feb. 23, 2021.

Japanese Office Action, Application No. 2022578748, 8 pages, Apr. 2, 2024.

* cited by examiner

ELECTRONIC MODULE

CROSS-REFERENCE TO RELATED APPLICATIONS

This application is a U.S. National Stage Application of International Application No. PCT/EP2021/063309 filed May 19, 2021, which designates the United States of America, and claims priority to EP Application No. 20193548.3 filed Aug. 31, 2020 and DE Application No. 10 2020 208 054.2 filed Jun. 29, 2020, the contents of which are hereby incorporated by reference in their entirety.

TECHNICAL FIELD

The present disclosure relates to electronics. Various embodiments include electronic modules.

BACKGROUND

It is known to use MEMS switches (MEMS="Micro-Electro Mechanical Systems") for switching in electronic modules. Such MEMS switches consist of micromechanically manufactured movable switching elements which can be appropriately actuated electrically, in particular electrostatically. An example of such a MEMS switch is described in Document DE102017215236A1.

For many applications, MEMS switches must be integrated in a larger circuit in order to ensure adequate functionality. However, for construction-related reasons MEMS switches are typically built on their own substrates, also called wafers, which support the switch contacts of the MEMS switch. Integrating the MEMS switches in the overall circuit is often expensive and takes up a lot of space. In addition, the electrical connection of the MEMS switches to another part of the circuit regularly results in parasitic inductances, capacitances and line resistances, which make efficient operation of the MEMS switches more difficult.

SUMMARY

In this context, the teachings of the present disclosure include improved electronic modules, which in particular can be constructed at lower cost and/or with less space requirement, and typically can be operated more efficiently. For example, some embodiments of the teachings herein include an electronic module having at least one MEMS switch (110) with a substrate (120) and having at least one semiconductor component (270), in which the at least one semiconductor component (270) is formed with the substrate (120) and connected to the at least one MEMS switch (110), wherein the at least one semiconductor component (270) is or includes a diode, and wherein the substrate is formed from or with a silicon-on-insulator-wafer and/or silicon-on-insulator substrate.

In some embodiments, the at least one semiconductor component (270) is formed by doping the substrate (120).

In some embodiments, the diode is a pn-diode and/or a Schottky diode or a PIN diode.

In some embodiments, the at least one semiconductor component (270) is or includes an arrangement of diodes in series.

In some embodiments, the at least one semiconductor component (270) is or includes an arrangement of diodes in parallel.

In some embodiments, the at least one semiconductor component (270) connects a source terminal (210) and a drain terminal (220) of the at least one MEMS switch.

In some embodiments, the at least one semiconductor component connects gate terminals (250, 260) of the at least one MEMS switch (110) to each other.

In some embodiments, the at least one semiconductor component (270) is part of a supply line (170) to a source terminal (210) and/or drain terminal (220) and/or gate terminal (250, 260) of the at least one MEMS switch.

In some embodiments, the at least one MEMS switch (110) includes a flexure (150).

In some embodiments, the flexure (150) is a flexure beam.

BRIEF DESCRIPTION OF THE DRAWINGS

In the following text, the teachings are explained in greater detail with reference to an embodiment represented in the drawing.

In the drawing.

DETAILED DESCRIPTION

Figure 1:
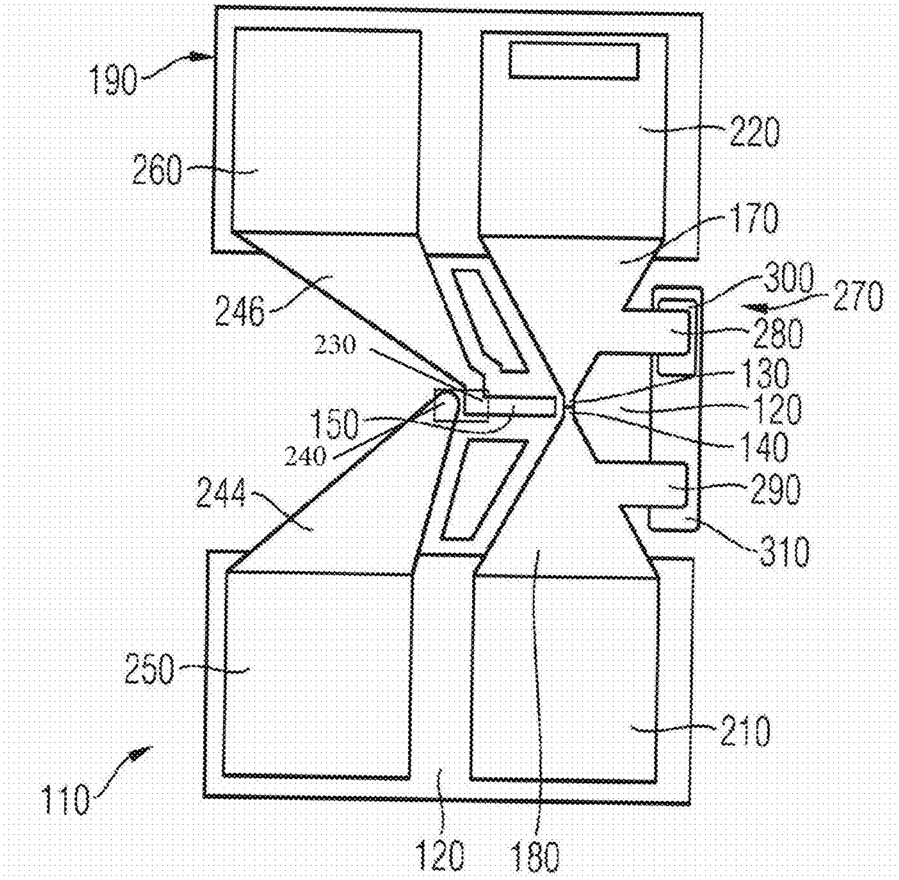
FIG. 1 shows a schematic plan view of an electronic module incorporating teachings of the present disclosure with a MEMS switch and a semiconductor component.

In some embodiments, an electronic module incorporating teachings of the present disclosure includes at least one MEMS switch with a substrate, wherein the electronic module includes at least one semiconductor component that is formed with the substrate and is connected to the at least one MEMS switch. In this way, the electronic module may be constructed with less space requirement and less expensively, since the wafer of the at least one MEMS switch also serves to provide the at least one semiconductor component. At the same time, a time- and cost-intensive connection of the at least one MEMS switch to the at least one semiconductor component is unnecessary, since line connections between the at least one MEMS switch and the at least one semiconductor component can be created simply and in a manner known per se with surface metallizations of the substrate. Consequently, a connection to external semiconductor components is not necessary, with the result that parasitic inductances, capacitances and line resistances can be prevented simply. In some embodiments, the at least one MEMS switch is formed with the at least one semiconductor component by means of at least one metallization of the substrate.

In some embodiments, the MEMS switch with the electronic module may make it possible to provide more than just simple switching functions, but additional functions may be easily enabled by means of the at least one semiconductor component. In particular, such additional functions may be protection functions, in particular providing protection from transient overvoltages or a free-wheeling function in converter applications. In contrast to this, the MEMS switches in known electronic modules have only a simple switching functionality whereas additional functions must typically be provided with the aid of external components.

In some embodiments, the at least one semiconductor component in the electronic module is formed by doping of the substrate. In this further development, the electronic module is advantageously simple to produce. Thus, the at least one semiconductor component may be constructed on the substrate before production of the actual MEMS switch by doping the requisite doping zones, i.e. in particular p-zones and n-zones, also referred to hereafter as p-doped regions and n-doped regions, in the substrate in a manner known per se. For This purpose the substrate may be embodied as a silicon wafer, in particular including or consisting of bulk silicon or as a SOI wafer (SOI="Silicon-on-Insulator"). In general, the wafer used for production may be undoped and/or p-doped and/or n-doped.

Doping zones can be introduced into the substrate in a manner known per se using for example methods that are standard in CMOS technology, in particular by means of oxidation and/or photolithography and/or ion implantation and/or diffusion. The type and parameters of the at least one semiconductor component may easily be adjusted by means of the dopant concentration and/or doping profiles and/or doping concentrations. Contacting of the at least one semiconductor components may be assured by means of a metallization of the wafer, in particular a semiconductor metallization, and may generally be created after the doping, in particular during production of the MEMS switch.

In some embodiments, the wafer in the electronic module may be formed from or with one or more semiconductor, in particular with silicon, and/or from or with a silicon-on-insulator substrate. For practical purposes, the at least one semiconductor component in the electronic module may be a diode or diodelike component such as a Schottky diode or PIN diode, or it includes such a diode. Diodes may advantageously be connected to the MEMS switches as overvoltage protection, and for practical purposes may be provided between different terminals, to provide protection from voltage pulses in various circuits, particularly also in AC voltage applications.

In some embodiments, the at least one semiconductor component in the electronic module is an arrangement of diodes in series or it includes such an arrangement in series. Arrangements of diodes in series, i.e. series circuits of diodes with each other may advantageously increase the dielectric strength of the diodes.

In some embodiments, the at least one semiconductor component in the electronic module is an arrangement of diodes in parallel, or the at least one semiconductor component comprises such an arrangement in parallel. Arrangements of diodes in parallel, i.e. parallel circuits of diodes with each other, may advantageously increase the current carrying capacity of the diodes.

In some embodiments, the at least one semiconductor component in the electronic module practically connects a source terminal and a drain terminal of the MEMS switch to each other. In some embodiments, the semiconductor component is a diode that is connected in particular in parallel or antiparallel to the drain and source terminals. In this further development, the semiconductor component may advantageously function as overvoltage protection, in particular in the manner of a freewheeling diode.

In some embodiments, the at least one semiconductor component in the electronic module connects gate terminals of the MEMS switch to each other.

In some embodiments, the at least one semiconductor component in the electronic module is part of a supply line to a source terminal and/or drain terminal and/or gate terminal. In this further development, the semiconductor component may be also a diode, so that a step-up converter or another converter/converter part may be created by means of the electronic module.

In some embodiments, the semiconductor component in the electronic module is a diode and connects the gate terminal and the source terminal and/or the gate terminal and the drain terminal of the MEMS switch. In this further development, an overvoltage protection is realized by means of the diode.

In some embodiments, the MEMS switch in the electronic module includes a flexure. The flexure in the electronic module may be a flexure beam.

The MEMS switch 110 represented in FIG. 1 may be formed with a silicon wafer, in the embodiment shown a silicon-on-insulator-wafer 120 (SOI wafer). In further embodiments, not shown individually, the MEMS switch 110 may also be formed with a wafer made entirely out of silicon instead.

The MEMS switch 110 has two switch contacts 130, 140 in the form of surface metallizations, which are arranged on the surface of the SOI wafer 120. The two switch contacts 130, 140 are arranged at a distance from each other, and can be connected to each other in an electrically conductive manner, i.e. interconnected, by means of a movable switch contact. The movable switch contact is arranged on a flexure of the MEMS switch 110, a flexure beam 150 in the embodiment shown. The movable switch contact is arranged on a free end 160 of the flexure beam 150, which extends further from a fixed end of the flexure beam 150, which is anchored on the other parts of the SOI wafer 120, in the direction of a longitudinal extension of the flexure beam 150. The movable switch contact is movable due to a deflection of the free end of the flexure beam 150. The flexure beam 150 may be produced subtractively from the SOI substrate as described in general in Document DE102017215236A1.

The switch contacts 130, 140 arranged on the SOI wafer 120 are each connected in an electrically conductive manner to supply wires 170, 180, which continue away from each other in a direction perpendicular to the longitudinal extension of the flexure beam 150 and each end in terminals in a terminal area 190, 200, a source terminal 210 and a drain terminal 220. The supply lines 170, 180 each widen between the switch contacts 130, 140 and the terminals, from microscopic dimensions, i.e. from dimensions between ten and fifty micrometers, to macroscopically operable dimensions, which are many times greater than said microscopic dimensions. The terminals form a source terminal 210 and a drain terminal 220 of the MEMS switch 110.

The MEMS switch 110 is controlled—that is to say switched—electrostatically. For this purpose, the MEMS switch 110 has a control contact on the flexure beam 150 of the MEMS switch 150, which faces towards a further control contact on another part of the SOI wafer 120. When voltages of opposite polarity are applied to the control contacts, the flexure beam 150 of the MEMS switch 110 is attracted to the other parts of the SOI wafer 120 and consequently guided into a closed position of the MEMS switch 110. When voltages of the same polarity are applied to the control contacts 230, 240, the MEMS switch 110 is opened.

The control contacts 230, 240 are connected in an electrically conductive manner with terminals by means of supply lines 244, 246, each of which widen into macroscopically operable dimensions, which terminals form gate terminals 250, 260 of the MEMS switch 110. The gate terminals 250, 260 are also located in the terminal areas 190, 200. With this arrangement, therefore, a current flow between the source terminal 210 and the drain terminal 220 may be controlled with the MEMS switch 110 through actuation by means of the gate terminals 250, 260.

The MEMS switch 110 is connected to a semiconductor component in the form of a diode 270. For this purpose, diode terminals 280, 290 are constructed on the supply lines 170, 180, each forming a surface metallization of the SOI wafer 120 and continuing in a direction away from there in the direction of the longitudinal extension of the flexure beam 150.

The diode terminals 280, 290 lead to doped regions 300, 310 of the SOI wafer 120, which form the diode 270. Accordingly, the diode terminal 280 electrically contacts the supply line 170 with an n-doped region 300 of the SOI wafer 120. The diode terminal 290 contacts the supply line 180 with a p-doped region 310 of the SOI wafer 120, which surrounds the n-doped region 300 of the SOI wafer, that is to say the circumference of the n-doped region 300 is completely surrounded by the p-doped region 310 in two-dimensional directions of a surface of the SOI wafer 120. The p-doped region 310 also separates the n-doped region 300 completely from other parts of the SOI wafer 310 in downward directions of the SOI wafer 120, as the -doped region 310 is positioned between the n-doped region 300 and other parts of the SOI wafer 120.

Consequently, a p-n transition is created between the p-doped region 310 and the n-doped region 300, which functions as a flow control valve in the form of the diode 270. In the embodiment shown in FIG. 1, diode 270 connects source terminal 210 and drain terminal 220 to each other.

Figure 2:
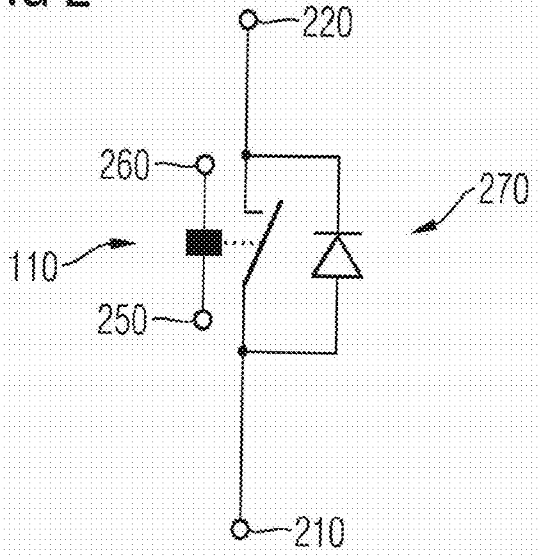
FIG. 2 shows a schematic equivalent circuit diagram of the electronic module of FIG. 1.

The arrangement of MEMS switch 110 and diode 270 created on the same SOI wafer 120 forms an electronic module according to the invention and is represented in FIG. 2 by an equivalent circuit diagram.

Figure 3:
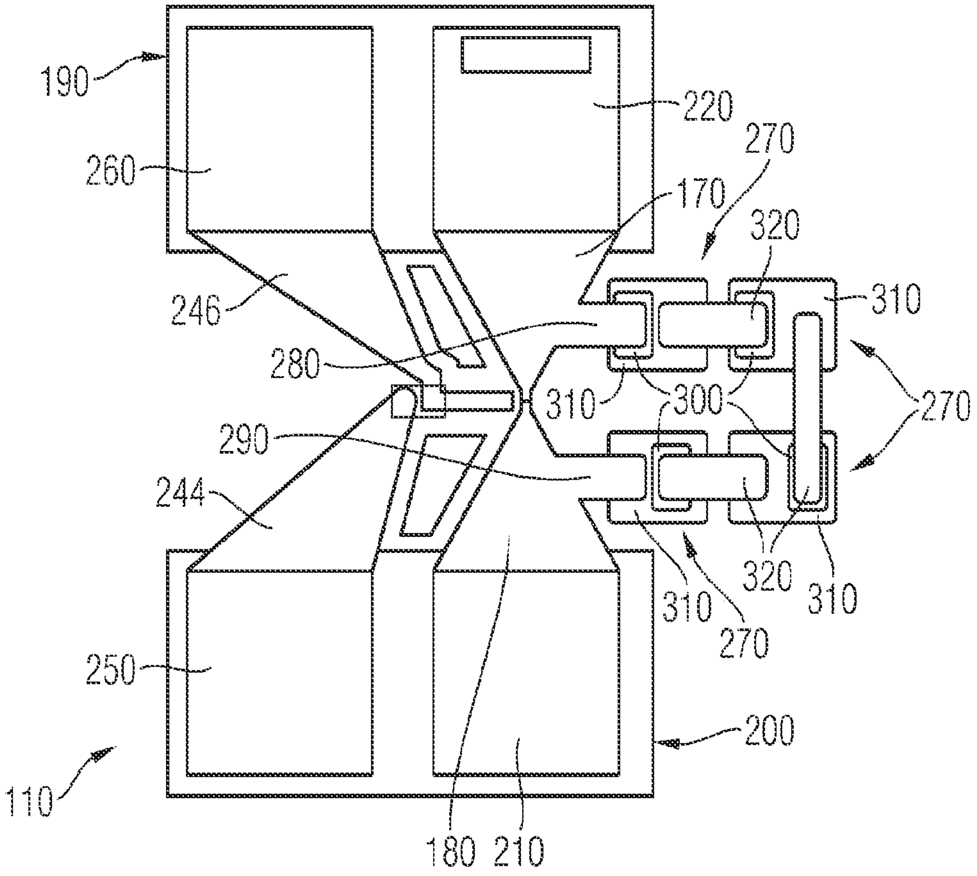
FIG. 3 shows a schematic plan view of a further embodiment of an electronic module according to the invention with a MEMS switch and a number of semiconductor components on a load side of the MEMS switch.
Figure 4:
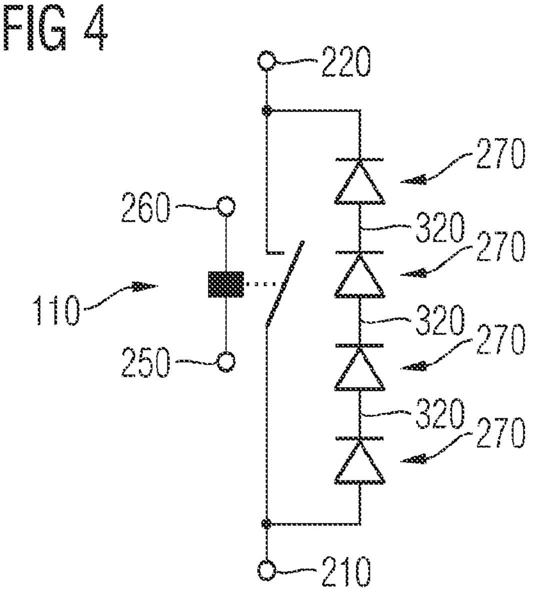
FIG. 4 shows a schematic equivalent circuit diagram of the electronic module of FIG. 3.

A second embodiment of the electronic module incorporating teachings of the present disclosure as represented in FIGS. 3 and 4 is generally constructed in a similar manner to the first embodiment, shown in FIGS. 1 and 2. However, as shown in FIG. 3, one way in which the second embodiment differs is that four diodes 270 connected in series are present instead of a single diode 270. The diodes 270 are arranged in a U-shape which is open in a direction of the flexure beam 150, between the diode terminals 280, 290 and in contact therewith. The diodes 270 are electrically connected to each other via surface metallizations 320, which are deposited on the surface of the SOI wafer 120. The arrangement in series of the four diodes 270 increases the dielectric strength compared with a single diode 270.

FIG. 4 shows an equivalent circuit diagram for the arrangement shown in FIG. 3.

Figure 5:
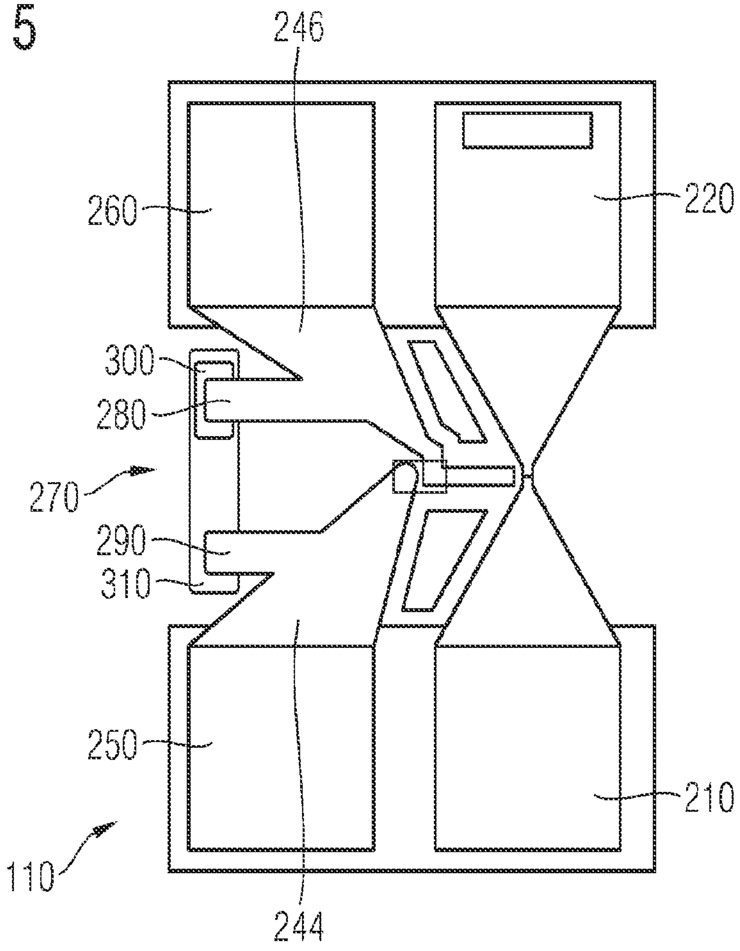
FIG. 5 shows a schematic plan view of a further embodiment of an electronic module incorporating teachings of the present disclosure with a MEMS switch and a semiconductor component on a control side of the MEMS switch.
Figure 6:
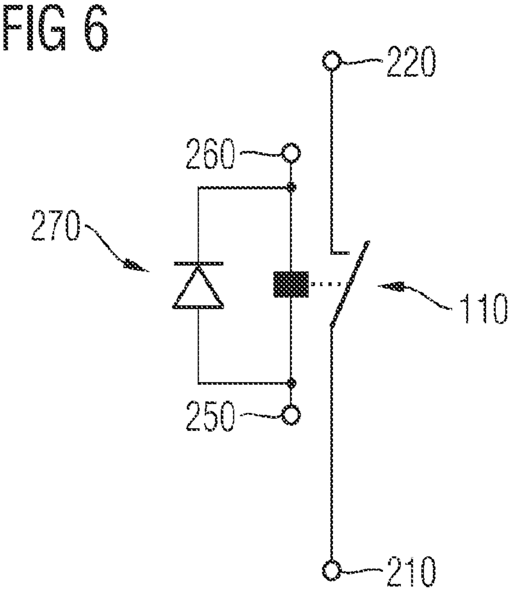
FIG. 6 shows a schematic equivalent circuit diagram of the electronic module of FIG. 5.

In a third embodiment of the electronic module incorporating teachings of the present disclosure, which is otherwise generally the same as the embodiments described previously, the diode 270 does not connect the source terminal 210 and the drain terminal 220 to each other, but the gate terminals 250, 260. For this purpose, the diode terminals 280, 290 are not constructed from the supply lines 170, 180, rather the diode terminals 280, 290 form parts of the supply lines 244, 246 of the gate terminals 250, 260 and extend away from the flexure beam 150 in the direction of the longitudinal extension of the flexure beam 150. In the embodiment shown, the diode 270 is constructed in the same way as the diode 270 in the embodiment described earlier. An equivalent circuit diagram for this configuration is shown in FIG. 5.

Figure 7:
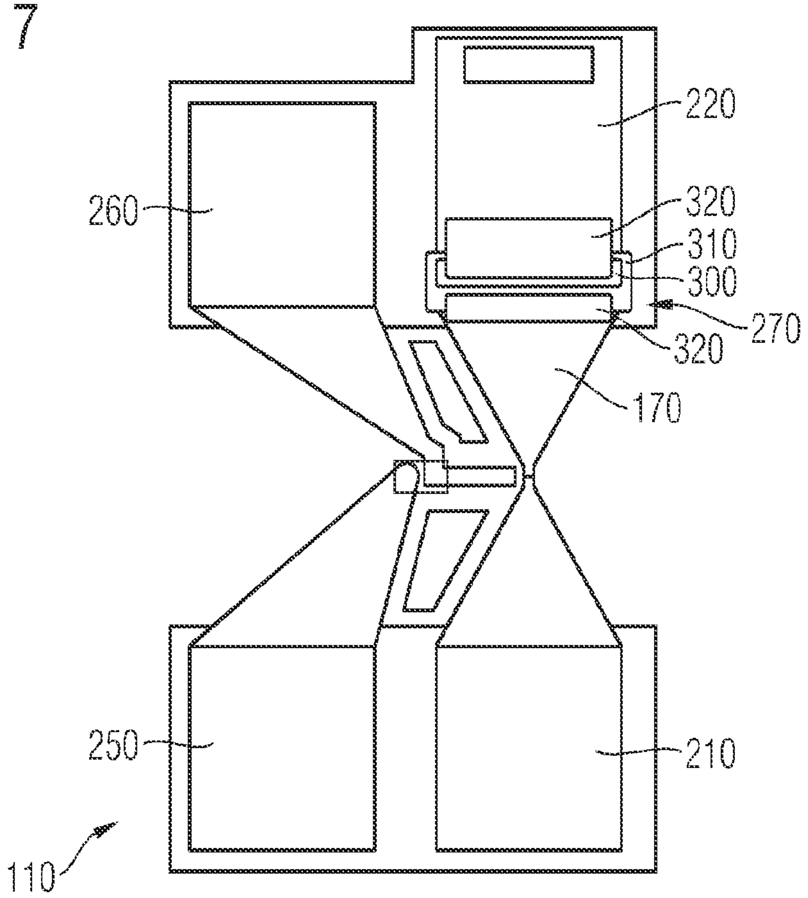
FIG. 7 shows a schematic plan view of a further embodiment of an electronic module incorporating teachings of the present disclosure with a MEMS switch and a semiconductor component.
Figure 8:
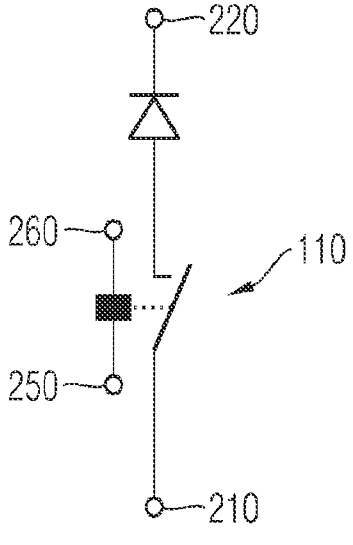
FIG. 8 shows a schematic equivalent circuit diagram of the electronic module of FIG. 7.

In a fourth embodiment, represented in FIG. 7, unlike in the embodiments described previously the diode 270 is part of the supply line 170 of the drain terminal 220. For this purpose, the diode 270, which is constructed identically to the diodes 270 of the embodiments described previously, is connected to the drain terminal 220 and to the other parts of the supply line 170 via surface metallizations 320. An equivalent circuit diagram for this arrangement is shown in FIG. 8.

In principle, in other embodiments not shown individually, the diode 270 may connect a gate terminal 250, 260 of the MEMS switch to a source terminal 210 of the MEMS switch 110 or to a drain terminal 220 of the MEMS switch 110 as overvoltage protection.

The invention claimed is:

1. An electronic module comprising:

a microelectromechanical system (MEMS) switch configured to open when voltages of matching polarity are applied to a first control contact and a second control contact;

a substrate; and a semiconductor component including a diode configured to provide overvoltage protection;

wherein the semiconductor component is formed with the substrate and connected to the MEMS switch; and wherein the substrate comprises a silicon-on-insulator-wafer and/or silicon-on-insulator substrate.

2. The electronic module as claimed in claim 1, wherein the semiconductor component is formed by doping the substrate.

3. The electronic module as claimed in claim 1, wherein the diode comprises a pn-diode, a Schottky diode, and/or a PIN diode.

4. The electronic module as claimed in claim 1, wherein the semiconductor component includes an arrangement of diodes in series.

5. The electronic module as claimed in claim 1, wherein the semiconductor component includes an arrangement of diodes in parallel.

6. The electronic module as claimed in claim 1, wherein the semiconductor component connects a source terminal and a drain terminal of the MEMS switch.

7. The electronic module as claimed in claim 1, wherein the semiconductor component connects gate terminals of the MEMS switch to each other.

8. The electronic module as claimed in claim 1, wherein the semiconductor component is part of a supply line to a source terminal and/or a drain terminal and/or a gate terminal of the MEMS switch.

9. The electronic module as claimed in claim 1, wherein the MEMS switch includes a flexure.

10. The electronic module as claimed in claim 9, in which the flexure comprises a flexure beam.

* * * * *